(12) United States Patent
Shang

(10) Patent No.: US 7,355,792 B2
(45) Date of Patent: Apr. 8, 2008

(54) CWDM FILTER FOR ELIMINATING NOISE

(75) Inventor: Chang Chen E Shang, Taichung (TW)

(73) Assignee: Asia Optical Co., Inc, Taichung (TW)

(*) Notice: Subject to any disclaimer, the term of this patent is extended or adjusted under 35 U.S.C. 154(b) by 316 days.

(21) Appl. No.: 11/154,831

(22) Filed: Jun. 17, 2005

(65) Prior Publication Data
US 2006/0012882 A1  Jan. 19, 2006

(30) Foreign Application Priority Data
Jul. 16, 2004 (TW) .............................. 93121336 A

(51) Int. Cl.
*G02B 1/10* (2006.01)

(52) U.S. Cl. .................. 359/587; 359/587; 359/590

(58) Field of Classification Search ................ 359/589, 359/587, 590
See application file for complete search history.

(56) References Cited

U.S. PATENT DOCUMENTS

| 6,018,421 A * | 1/2000 | Cushing ..................... 359/589 |
| 6,404,521 B1 | 6/2002 | Yang et al. |
| 6,850,366 B2 * | 2/2005 | Hendrix et al. ............. 359/589 |

\* cited by examiner

*Primary Examiner*—Fayez G. Assaf

(57) ABSTRACT

A CWDM filter of the present invention comprises a substrate; a first portion formed on the substrate having at least two first stacking structures; a second portion superposed on the first portion including at least two second stacking structures; and a first matching layer sandwiched between the first and second portions. Each of the first stacking structures of the first portion has a Fabry-Perot cavity and a first coupling layer which are stacked over each other in turn from the substrate. Each second stacking structure has a (HnLH) structure and a second coupling layer, wherein n represents a positive integer greater than 1, L represents a low index layer with a thickness of $\lambda_o/4$, H represents a high index layer with a thickness of $\lambda_o/4$, and $\lambda_o$ is the center wavelength of said noise.

28 Claims, 3 Drawing Sheets

CWDM FILTER FOR ELIMINATING NOISE

TECHNICAL FIELD

The present invention relates to an optical filter, especially to a CWDM □coarse wavelength division multiplex□filter which can eliminate noise.

DESCRIPTION OF RELATED ARTS

A called "Optical filter" is a component, which serves to select a desired wavelength range, necessarily applied in optical fiber communication systems or optical detecting systems. Normally, the optical filters have active type and passive type. The passive type optical filters are made on a basis of lens, diffraction grating and spectrum (frequency) filter. The active type optical filter can be the combination of proper passive components and periodic detectors each with a specific frequency.

There is an interference film type optical filter among the passive ones. The interference film optical filters are commonly composed of materials of high and/or low refraction indexes, whose thicknesses usually are preset to be multiples of a quarter of the wavelength of the incident light thereof. The materials are often deposited on a substrate made of glass or similar materials so as to achieve specific wavelength response characters as required. Normally, a medium film interference optical filter is consisted of high and low refraction index layers (films) which are alternately superposed over each other, and each whose thicknesses are normally multiples of a quarter of the center wavelength among a desired wavelength range selected by the filter. Meanwhile, a phase of a light reflected by the high refraction index layers remains unchanged but a phase of a light reflected by the low refraction index layers is shifted to 180°.

Due to the path differences (multiples of $2*\lambda/4$) between different lights, lights reflected in turn will become superposed ahead thereby producing a high-intensity light beam having a narrower wavelength range. Any one reflected light wavelength out of the narrow wavelength range will suddenly become decreased. Hence, such kind of filters is commonly used to make high pass optical filters, low pass optical filters or high reflective film components. Furthermore, as the filter's optic characters depending on the reflection and transmission characters of the optical films thereof, such films are usually adopted to manufacture band-pass filters, low-pass filters, high-pass filters or band-reject filters.

A Chinese utility patent CN982237448B provides a four quarter-wavelength narrow band optical filter with a 4.65 micron center wavelength thereof. This filter is made by a vacuum coating method, with a substrate material of $Al_2O_3$ and a layer material of ZnSe and TePb thereof. The film stack system thereof is designed to adopt structures of alternately superposed multi half wavelength layers with the cut-off area thereof TMAX<0.3%. Such design can be applied in the CO gas microanalysis fields of chemical industry, environment protection, iron and steel industry and medicine industry.

Advanced coating technology can be used to make extremely narrow band optical filters out of multi-layer medium film interference filters, thereby producing dense wavelength division multiplexers (DWDM) with the multiplexing channel spaces thereof less than 1 nm.

A Chinese patent application CN011390824A publishes an extremely narrow band film filter. The filter includes bottom layers vacuum vaporized in turn on a glass substrate, middle layers and top layers. The bottom layers are the combination of stochastic low refraction index layers alternately stacked over stochastic high refraction index layers. The middle layers and the top layers are respectively composed of stochastic layers with high refraction index and stochastic layers with medium refraction index which are alternately superposed over the stochastic layers with high refraction index thereof. The stochastic layers thereof are produced by proper randomly deposition method.

U.S. Pat. No. 6,404,521B1 discloses an optical filter system for adjusting the light transmission feature of a DWDM system, which uses an optic fiber cascade tree structure with N+1 stairs thereof. When it is combined with a multi-layer filter, it can also achieve the function of optic isolation, wherein the multi-layer filter may adopt Fabry-Perot Etalon (FPE).

As far as a MAN (Metropolitan area network) is concerned, no high requirements are imposed upon the transmission attenuation of simplex optic fibers, neither does it require an optic fiber amplifier. Hence, a relatively wide window of 1200-1700 nm can be used, and even the space between adjacent wavelength channels can be increased to be 10 or 20 nm, a WDM system having tens of channels can also be achieved, i.e., a coarse wavelength division multiplex (CWDM) system. The space between different wavelength channels propagating in a same optic fiber is the major parameter to differentiate DWDM and CWDM. The space between adjacent wavelength channels of a DWDM system is usually 200 GHz (0.8 nm) or 50 GHz (0.4 nm), and it may become narrower in a future system. However, the CWDM technology makes full use of the feature of short transmission distance of MAN, so that it is not limited by the amplifying wavelength range of EDFA (Erbium doped fiber amplifier). Instead, it can perform wavelength division multiplexing function at a wavelength space much wider than that of a DWDM system in the whole optic fiber propagation window of 1310-1560 nm.

In the aspects of multiplexer and de-multiplexer, the cost differences between a DWDM system and a CWDM system mainly lie in the fact that a CWDM filter contains less layers which makes it cheaper than a DWDM filter. A 0.8 nm optic filter of a DWDM system usually has about 300 layers, while a 20 nm optic filter of a CWDM system only need about 150 layers, which results in that the cost of a CWDM filter is about 50% less than that of a DWDM filter. In a CWDM system, as the space between adjacent channels can be broadened to be 20 nm, cheap multiplexers and de-multiplexers can thus be employed therein, thereby decreasing the cost of the CWDM system.

Nowadays, the widely applied WDM with 0.8 nm wavelength space in a DWDM system commonly adopt multi-layer interference optic filters. An ideal interference filter for it is an interference band pass filter with $\lambda/4$ multi-layers with different thicknesses thereof. It is to insert a coupling layer between two high reflectivity multi-layer cavity structures. The superposition area between the two high reflectivity multi-layer cavity structures has an extremely low reflection value, and the function of the coupling layer is to remove the extremely low reflection value, i.e., to broaden the reflection zone thereof. The high reflectivity multi-layer cavity structures each are consisted of 2n+1 layers of alternately stacked high refraction index films (layers) and low refraction index films (layers), whose thicknesses are $\lambda/4$ (center wavelength thereof).

Commonly, CWDM optic filters adopt stacks of plurality of multi-layer cavities with the same structure, whose layer thickness is a multiple of a quarter of the center wavelength thereof. However, in its 1260-1640 nm wavelength range, phenomena of light leakage or noises will occur in wavelength ranges other than that of the signals of the filter.

SUMMARY OF THE INVENTION

A main object of the present invention is to provide a CWDM □coarse wavelength division multiplex□filter which can eliminate noise In order to achieve the objects as set forth, a CWDM filter is provided to include a substrate, a first portion formed on the substrate having at least two first stacking structures, a second portion superposed on the first portion, and a first matching layer which is sandwiched between the first and second portions. Each of the first stacking structures of the first portion has a Fabry-Perot cavity and a first coupling layer which are stacked over each other in turn from the substrate. The second portion comprises at least two second stacking structures and each second stacking structure thereof has a (HnLH) structure and a second coupling layer. Among which, n presents a positive integer greater than 1, L represents a low (refraction) index layer with a thickness of $\lambda_o/4$, H is a high (refraction) index layer with a thickness of $\lambda_o/4$, and $\lambda_o$ is the center wavelength of the noise. n=2q, q is a positive integer.

The second coupling layer is expressed as L, and L is a low (refraction) index layer with a thickness of $\lambda_o/4$. $\lambda_o$ is the center wavelength of the noise.

The first matching layer is mH, m is a positive integer, H is a high (refraction) index layer with a thickness of $\lambda_o/4$, and $\lambda_o$ is the center wavelength of the noise.

The filter in accordance with the present invention further comprises a second matching layer which is stacked on the second portion. The second matching layer has a 1.7239 H sub-layer and a 0.582 L sub-layer. 1.7239 H is a high (refraction) index sub-layer with a thickness of 1.7239 multiples of $\lambda_o/4$. 0.582 L is a low (refraction) index sub-layer with a thickness of 0.582 multiple of $\lambda_o/4$. $\lambda_o$ is the center wavelength of the noise.

Each Fabry-Perot cavity follows the rule of H'(L'H')$^a$kL' (H'L')$^a$H', whose layers are arranged in turn and start from the side of the substrate. Among which, a is a positive integer, and k is a positive integer greater than 1. $\lambda'_0$ is 1470 nm and is the center wavelength of the transmitted lights through the CWDM filter of the present invention. The first coupling layer is L'. L' is a low (refraction) index layer with a thickness of $\lambda'_0/4$, and H' is a high (refraction) index layer with a thickness of $\lambda'_0/4$.

From the side of the substrate, the configuration of the first portion is expressed as follows:

H'(L'H')$^2$6L'(H'L')$^2$H'L'H'(L'H')$^3$2L'(H'L')$^3$H'L'H'(L'H')$^3$ 6L'(H'L')$^3$H'L'H'(L'H')$^3$4L'(H'L')$^3$H'L'H'(L'H')$^3$6L'(H'L')$^3$ H'L'H'(L'H')$^3$4L'(H'L')$^3$H'L'H'(L'H')$^3$6L'(H'L')$^3$H'L'H' (L'H')$^3$ 2L'(H'L')$^3$H'L'H'(L'H')$^2$6L'(H'L')$^2$H'L'.

The second portion thereof is similarly expressed as:

L(H2LH)L(H2LH)L(H4LH)L(H4LH)L(H4LH)L(H4LH) L(H4LH)L(H2LH)L(H2LH)L.

On the other side, the CWDM filter in accordance with the present invention may comprise the substrate, the first portion having at least two first stacking structures, the second portion including at least two second stacking structures, and the first matching layer sandwiched between the first and second portions. Each of the first stacking structures, from the side of the substrate, includes a first multi-layer, a spacer layer, a second multi-layer and a first coupling layer. Each of the second stacking structures comprises a (HnLH) structure and a second coupling layer. Among which, n is a positive integer greater than 1, L is a low (refraction) index layer with a thickness of $\lambda_o/4$, H is a high (refraction) index layer with a thickness of $\lambda_o/4$, and $\lambda_o$ is the center wavelength of the noise. n=2q, and q is a positive integer.

The first and second multi-layers of each first stacking structure of the first portion are symmetrically arranged with respect to the spacer layer. The spacer layer is expressed as kL', and k is a positive integer greater than 1.

The first coupling layer is L' and the second coupling is L. Among which, L represents a low (refraction) index layer with a thickness of $\lambda_o/4$, $\lambda_o$ is the center wavelength of the noise.

The first matching layer is mH and m is a positive integer. H represents a high (refraction) index layer with a thickness of $\lambda_o/4$, and $\lambda_o$ is the center wavelength of the noise.

The filter of the present invention further comprises a second matching layer formed on the second portion thereof. From the side of the substrate, the second matching layer sequentially includes 1.7239 H and 0.582 L. L is a low (refraction) index layer with a thickness of $\lambda_o/4$, H is a high (refraction) index layer with a thickness of $\lambda_o/4$, and $\lambda_o$ is the center wavelength of the noise.

The first multi-layer is expressed as H'(L'H')$^a$, and the second multi-layer is expressed as (H'L')$^a$H'. Among which, a is a positive integer, L' is a low (refraction) index layer with a thickness of $\lambda_o/4$, H' is a high (refraction) index layer with a thickness of $\lambda'_0/4$, and $\lambda'_0$ is the center wavelength of the transmitted lights through the CWDM optical filter of the present invention.

The configuration of the second portion is: L(H2LH)L (H2LH)L(H4LH)L(H4LH)L(H4LH)L(H4LH)L(H4LH)L (H2LH)L(H2LH)L, while the configuration of the first portion, in turn from the side of the substrate, is: H'(L'H')$^2$6 L'(H'L')$^2$H'L'H'(L'H')$^3$2L'(H'L')$^3$H'L'H'(L'H')$^3$6L'(H'L')$^3$ H'L'H'(L'H')$^3$4L'(H'L')$^3$H'L'H'(L'H')$^3$6L'(H'L')$^3$H'L'H' (L'H')$^3$ 4L'(H'L')$^3$H'L'H'(L'H')$^3$6L'(H'L')$^3$H'L'H'(L'H')$^3$2L' (H'L')$^3$H'L'H'(L'H')$^2$6L'(H'L')$^2$H'L'.

The front cut-off wavelength of the present invention is 1230-1457 nm, and the behind cut-off wavelength thereof is 1483-1640 nm.

As mentioned above, CWDM filters often adopt λ/4 multi-layer stacks with the same structure, and in the 1260-1640 nm wavelength range, phenomena of light leakage or noises exist in wavelength ranges other than that of the signals of the filter. However, the CWDM filter in accordance with the present invention further stack a plurality of layers, whose thicknesses are multiples of λ/4, with different structures, so that the optical filter can eliminate the phenomena of light leakage or noises, thereby achieving wider applications in the wavelength ranges for optic communications.

Other objects, advantages and novel features of the invention will become more apparent from the following detailed description when taken in conjunction with the accompanying drawings.

DETAILED DESCRIPTION OF PREFERRED EMBODIMENT

Details will be given with the combination of the figures thereof to the CWDM (coarse wavelength division multiplex) filter in accordance with the present invention as follows.

Figure 1:
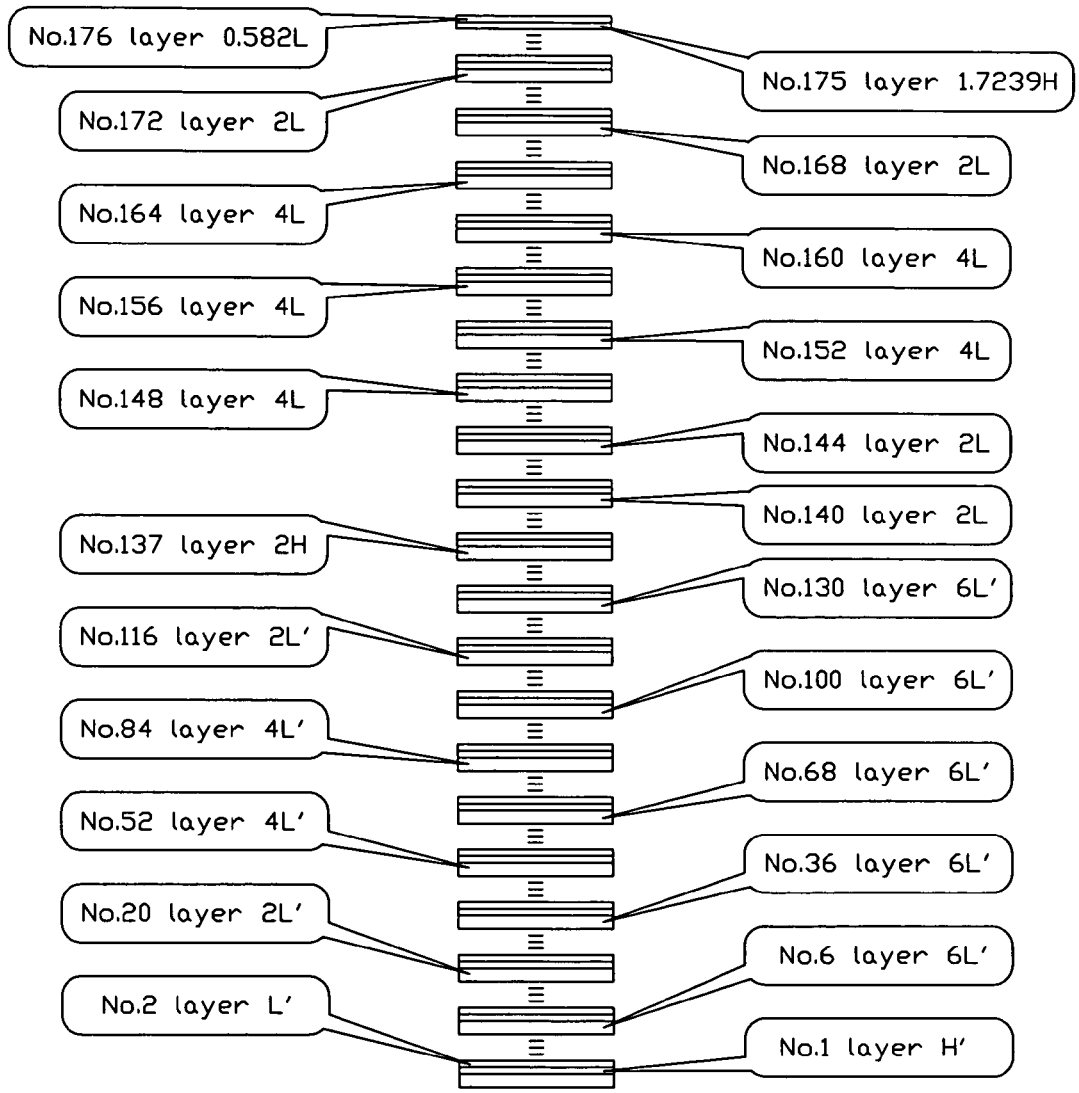
FIG. 1 is a sketch view of the multi-layer structure of the optical filter in accordance with the present invention.
Figure 2:
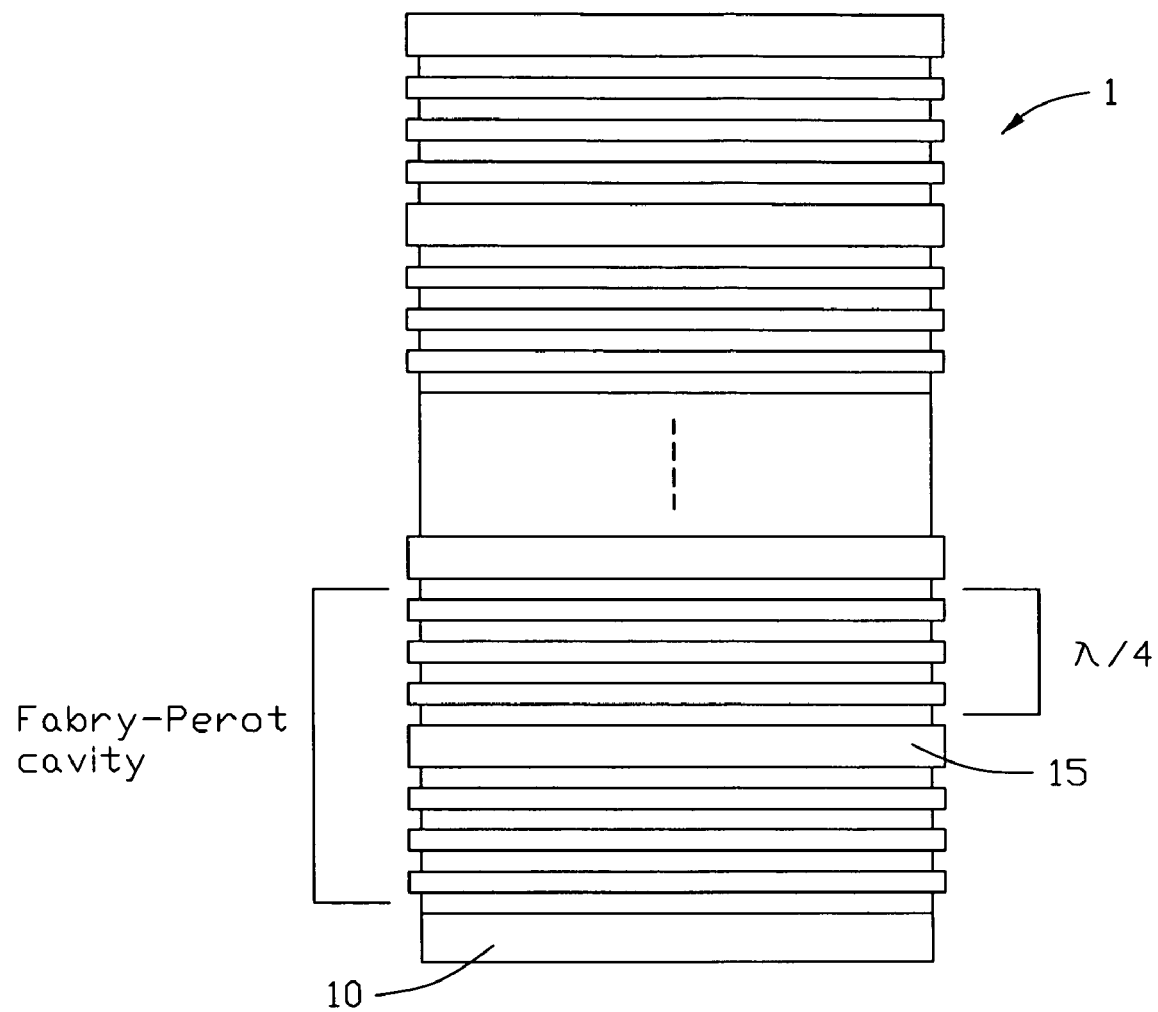
FIG. 2 is a sketch view of the optical filter in accordance with the present invention.

Referring to FIGS. 1 and 2, a CWDM filter 1 in accordance with the present invention comprises a substrate 10, a first portion formed on the substrate 10, a second portion superposed on the first portion, and a first matching layer sandwiched between the first and second portions.

The first portion has at least two first stacking structures, and each first stacking structure includes a Fabry-Perot cavity and a first coupling layer. The second portion is stacked on the first portion and has at least two second stacking structures thereof. Each second stacking structure, from the side of the substrate 10, in turn includes a HnLH structure and a second coupling layer.

The Fabry-Perot cavity of each first stacking structure comprises a first multi-layer, a spacer layer 15, a second multi-layer, and a first coupling layer. The first and second multi-layers are symmetrical with respect to the spacer layer 15. The configuration of the first multi-layer is expressed as $H'(L'H')^a$ and the configuration of the second multi-layer is expressed as $(H'L')^aH'$. The matching layer is kL'. Among which, a is a positive integer, L' is a low (refraction) index layer with a thickness of $\lambda'_0/4$, H' is a high (refraction) index layer with a thickness of $\lambda'_0/4$. And $\lambda'_0$ is 1470 nm and is the center wavelength of the transmitted lights through the CWDM filter. K is a positive integer greater than 1.

From the side of the substrate 10, the configuration of the first portion is:

$H'(L'H')^26$ $L'(H'L')^2H'L'H'(L'H')^32$ $L'(H'L')^3H'L'H'(L'H')^3$ $6$ $L'(H'L')^3H'L'H'(L'H')^34$ $L'(H'L')^3H'L'H'(L'H')^36$ $L'(H'L')^3$ $H'L'H'(L'H')^34$ $L'(H'L')^3H'L'H'(L'H')^36$ $L'(H'L')^3H'L'H'$ $(L'H')^32$ $L'(H'L')^3H'L'H'(L'H')^26$ $L'(H'L')^2H'L'\square$ As far as the second stacking structure of the second portion is concerned, n represents a positive integer greater than 1. Which is to say, n=2q, q is a positive integer. L is a low (refraction) index layer with a thickness of $\lambda_o/4$, H is a high (refraction) index layer with a thickness of $\lambda_o/4$, and $\lambda_o$ is the center wavelength of the noise.

The first matching layer is mH. m is a positive integer and is preferably to be a positive even number. H is a high (refraction) index layer with a thickness of $\lambda_o/4$, wherein $\lambda_o$ is the center wavelength of the noise.

The configuration of the second portion is: L(H2 LH)L (H2 LH)L(H4 LH)L(H4 LH)L(H4 LH)L(H4 LH)L(H4 LH)L(H2 LH)L(H2 LH)L.

The filter 1 of the present invention further includes a second matching layer stacked on the second portion. From the side of the substrate 10, the second matching layer sequentially has two sub-layers of 1.7239 H and 0.582 L. L is a low (refraction) index layer with a thickness of $\lambda_o/4$, and H is a high (refraction) index layer with a thickness of $\lambda_o/4$. $\lambda_o$ represents the center wavelength of the noise.

Some odd-numbered layers or even-numbered layers of the second portion have thicknesses of even-number multiples of a quarter of wavelength thereof. To be more detailed, it is the Nos. 137, 140, 144, 148, 152, 156, 160, 164, 168, 172 layers of the second portion that have the thicknesses of even-number multiples of a quarter of wavelength thereof. For example, the multiples may be 2 or 4.

The amount of the low and high refraction index layers, which are alternately stacked over each other, can be 40, 50, 60, and so on. The amount of the layers thereof may be determined according to detailed requirements and the application environment thereof. The present invention takes 40 layers as an exemplary one.

There are eight channels, that is, 1470 nm, 1490 nm, 1510 nm, 1530 nm, 1550 nm, 1570 nm, 1590 nm and 1610 nm, which are most commonly applied in optic communications. The optical filter in accordance with the present invention is mainly aiming at the channel of 1470 nm. Other embodiments for the other seven channels can be realized according to the similar design theory thereof. For example, the center wavelength being set to be 1490 nm can also be suitable for the present invention. Therefore, the center wavelength $\lambda'_0$ of the present invention may be 1470 or 1490 nm.

The maximal light transmission rate of the CWDM filter 1 of the present invention is higher than 90%. The front cut-off wavelength thereof is 1230-1457 nm (short wavelength), and the behind cut-off wavelength thereof is 1483-1640 nm (long wavelength).

The surface polishing diameter of the substrate 10 thereof is 90 mm, and the thickness thereof is 10 mm. The substrate 10 can contain such materials or elements as $SiO_2$, Barium, Lithium and Natrium therein. The low refraction index layers can adopt $SiO_2$ layers, and the high refraction index layers can be oxidation layers. The materials for $\lambda'_0/4$ layers (including low and high refraction index layers, i.e.) and the substrate 10 of the CWDM filter 1 may be decided as per detailed requirements or conditions thereof.

The rule for the front multi-layer stack system of the CWDM filter 1 in accordance with the present invention is: $N_o/(0.582L1.7239HLH2LHL)^1(H2L)^1(HLH)^1(4LHLH)^5$ $(2LHL)^1(H2LHL2H)^1(L'H')^36L'(H'L')^3H'(L'H')^32L'(H'L')^3$ $H'(L'H')^46L'(H'L')^4H'(L'H')^34L'(H'L')^3H'(L'H')^46L'(H'L')^4H'$ $(L'H')^34L'(H'L')^3H'(L'H')^46L'(H'L')^4H'(L'H')^32L'(H'L')^3H'$ $(L'H')^36L'(H'L')^2H'/N_s$.

While the rule for the rear multi-layer stack system thereof is $N_o/LHLH/N_s$.

Two adjacent Fabry-Perot cavities of the first portion are connected to each other by the coupling layer thereof. Each Fabry-Perot cavity is consisted of two multi-layer stack structures which each have odd-number or even-number layers.

With reference to FIG. 1, after the No. 1 layer, which is of high refraction index and has a thickness of $\lambda'_0/4$, is stacked on the substrate 10 of the CWDM filter 1. A low refraction index layer having a thickness of $\lambda'_0/4$ thereof is superposed over the No. 1 layer, and then in turn subsequent layers of high or low refraction index are alternately stacked over thereon until it comes to the No. 136 layer.

Among which, the No. 6 layer has sub-layers with the $\lambda'_0/4$ thickness stacked over each other for 6 times, that is, the thickness of the No. 6 layer is 6 multiples of $\lambda'_0/4$. Similarly, the No. 20 layer has sub-layers with the $\lambda'_0/4$ thickness stacked over each other for 2 times, the No. 36 layer has sub-layers with the $\lambda'_0/4$ thickness stacked over each other for 6 times, the No. 52 layer has sub-layers with the $\lambda'_0/4$ thickness stacked over each other for 4 times, the No. 68 layer has sub-layers with the $\lambda'_0/4$ thickness stacked over each other for 6 times, the No. 84 layer has sub-layers with the $\lambda'_0/4$ thickness stacked over each other for 4 times, the No. 100 layer has sub-layers with the $\lambda'_0/4$ thickness stacked over each other for 6 times, the No. 116 layer has sub-layers with the $\lambda'_0/4$ thickness stacked over each other for 2 times, the No. 130 layer has sub-layers with the $\lambda'_0/4$ thickness stacked over each other for 6 times.

Figure 3:
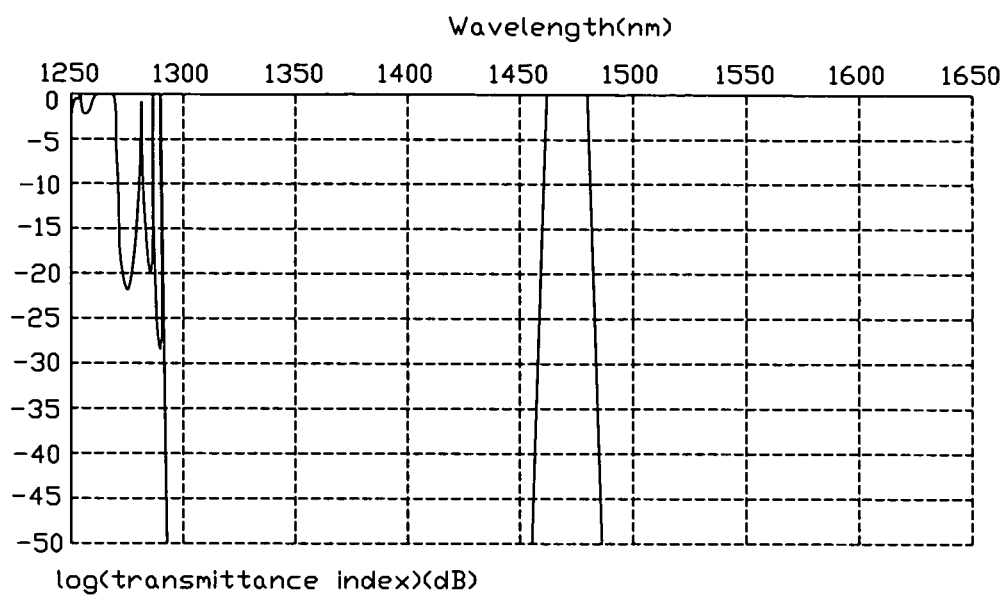
FIG. 3 is the spectrum characteristics graph of the first part of the CWDM optical filter in accordance with the present invention.
Figure 4:
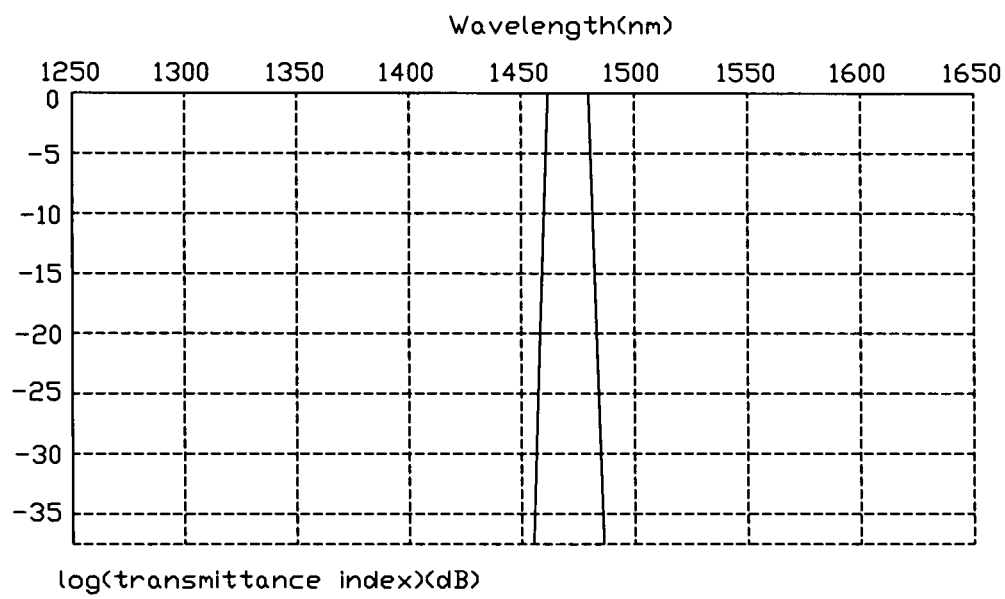
FIG. 4 is the spectrum characteristics graph of the CWDM optical filter in accordance with the present invention.

The above is the general idea for the first phase design of the optical filter 1 in accordance with the present invention, which uses high and low refraction index layers with thicknesses of multiples of $\lambda'_0/4$ stacked over each other alternately. The spectrum characteristics thereof please refer to FIG. 3, from which we may see that noises exist within the 1260-1288 nm wavelength range. In order to eliminate these noises, a second phase design of multi-layer stacks in accordance with the present invention shall be added accordingly.

In the first portion, the wavelength $\lambda'_0$, which, just as described above, is taken as the center wavelength of the CWDM filter 1, may be 1470 nm or 1490 nm.

The second phase design is to stack layers with thicknesses of multiples of $\lambda_o/4$ onto the top layer (the last layer) of the half-finished product (i.e., the first portion of the filter 1) in the first phase. That is, on the No. 136 layer of the first portion, high and low refraction index layers with thicknesses of multiples of $\lambda_o/4$ are continued to be alternately stacked thereon until it comes to 174 layers as a whole. And thus, the second portion of the filter 1 of the present invention is obtained.

Wherein, the No. 137 layer is of high refraction index and has sub-layers with the $\lambda_o/4$ thickness stacked over each other for 2 times; the No. 140 layer is of low refraction index and has sub-layers with the $\lambda_o/4$ thickness stacked over each other for 2 times; the No. 144 layer is of low refraction index and has sub-layers with the $\lambda_o/4$ thickness stacked over each other for 2 times; the No. 148 layer is of low refraction index and has sub-layers with the $\lambda_o/4$ thickness stacked over each other for 4 times; the No. 152 layer is of low refraction index and has sub-layers with the $\lambda_o/4$ thickness stacked over each other for 4 times; the No. 156 layer is of low refraction index and has sub-layers with the $\lambda_o/4$ thickness stacked over each other for 4 times; the No. 160 layer is of low refraction index and has sub-layers with the $\lambda_o/4$ thickness stacked over each other for 4 times; the No. 164 layer is of low refraction index and has sub-layers with the $\lambda_o/4$ thickness stacked over each other for 4 times; the No. 168 layer is of low refraction index and has sub-layers with the $\lambda_o/4$ thickness stacked over each other for 2 times; and the No. 172 layer is of low refraction index and has sub-layers with the $\lambda_o/4$ thickness stacked over each other for 2 times. Finally, on the No. 174 layer, the No. 175 layer of high refraction index and No. 176 layer of low refraction rate are continued to be alternately stacked thereon. However, the No. 175 and 176 layers respectively have thickness of non-integer multiple of $\lambda_o/4$. The No. 175 and 176 layers act as micro-adjusting layers to the whole multi-layer stack structures thereof. Thus, the whole CWDM filter 1 of the present invention is completed as a result thereof.

Among which, the No. 175 layer is of high refraction index and has a thickness of 1.7239 multiples of $\lambda_o/4$, while the No. 176 layer is of low refraction index and has a thickness of 0.582 multiple of $\lambda_o/4$.

Furthermore, the multi-layer stack structure of the present invention as a whole can be described as below:

The first portion of the filter 1: the No. 1 layer is of high refraction index and stacked on the substrate 10 thereof with a thickness of $\lambda'_0/4$; the No. 2 layer is of low refraction index and stacked on the No. 1 layer thereof with a thickness of $\lambda'_0/4$; . . . the No. 6 layer is of low refraction index and stacked on the No. 5 layer thereof with a thickness of 6 multiples of $\lambda'_0/4$; . . . the No. 20 layer is of low refraction index and stacked on the No. 19 layer thereof with a thickness of 2 multiples of $\lambda'_0/4$; . . . the No. 36 layer is of low refraction index and stacked on the No. 35 layer thereof with a thickness of 6 multiples of $\lambda'_0/4$; . . . the No. 52 layer is of low refraction index and stacked on the No. 51 layer thereof with a thickness of 4 multiples of $\lambda'_0/4$; . . . the No. 68 layer is of low refraction index and stacked on the No. 67 layer thereof with a thickness of 6 multiples of $\lambda'_0/4$; . . . the No. 84 layer is of low refraction index and stacked on the No. 83 layer thereof with a thickness of 4 multiples of $\lambda'_0/4$; . . . the No. 100 layer is of low refraction index and stacked on the No. 99 layer thereof with a thickness of 6 multiples of $\lambda'_0/4$; . . . the No. 116 layer is of low refraction index and stacked on the No. 115 layer thereof with a thickness of 2 multiples of $\lambda'_0/4$; . . . the No. 130 layer is of low refraction index and stacked on the No. 129 layer thereof with a thickness of 6 multiples of $\lambda'_0/4$.

The second portion thereof: the No. 137 layer is of high refraction index and stacked on the No. 136 layer thereof with a thickness of 2 multiples of $\lambda_o/4$; . . . the No. 140 layer is of low refraction index and stacked on the No. 139 layer thereof with a thickness of 2 multiples of $\lambda_o/4$; . . . the No. 144 layer is of low refraction index and stacked on the No. 143 layer thereof with a thickness of 2 multiples of $\lambda_o/4$; . . . the No. 148 layer is of low refraction index and stacked on the No. 147 layer thereof with a thickness of 4 multiples of $\lambda_o/4$; . . . the No. 152 layer is of low refraction index and stacked on the No. 151 layer thereof with a thickness of 4 multiples of $\lambda_o/4$; . . . the No. 156 layer is of low refraction index and stacked on the No. 155 layer thereof with a thickness of 4 multiples of $\lambda_o/4$; . . . the No. 160 layer is of low refraction index and stacked on the No. 159 layer thereof with a thickness of 4 multiples of $\lambda_o/4$; . . . the No. 164 layer is of low refraction index and stacked on the No. 163 layer thereof with a thickness of 4 multiples of $\lambda_o/4$; . . . the No. 168 layer is of low refraction index and stacked on the No. 167 layer thereof with a thickness of 2 multiples of $\lambda_o/4$; . . . the No. 172 layer is of low refraction index and stacked on the No. 171 layer thereof with a thickness of 2 multiples of $\lambda_o/4$; . . . the No. 175 layer is of high refraction index and stacked on the No. 174 layer thereof with a thickness of 1.7239 multiples of $\lambda_o/4$; and the No. 176 layer is of low refraction index and stacked on the No. 175 layer thereof with a thickness of 0.582 multiple of $\lambda_o/4$.

In the first portion, the wavelength $\lambda'_0$, which, just as described above, is taken as the center wavelength of the CWDM filter 1, may be 1470 nm or 1490 nm. On the other hand, in the second portion, the wavelength $\lambda_o$, which, just as described above, is taken as the center wavelength of the noise, and can be referred to the center wavelength of the wavelength range of the noise as shown by the optic spectrum character graph of the first part of the filter 1 in FIG. 3. As far as the present invention is concerned, $\lambda_0$ is equal to about 1270 nm.

It is common that there is an extremum value existed when the thickness of a $\lambda/4$ layer is nd=$\lambda/4$. If adopting a penetrating transmission type auto-monitor system with a precision of 0.01% to monitor the thickness thereof. Which is to say, the system will stop monitoring instantly when the thickness reaches its extremum value (maximum value or minimum value). The refraction index of the high refraction rate layers may be 2.1-2.4, while that of the low refraction index layers may usually be 1.44.

As mentioned above, CWDM filters often adopt $\lambda/4$ thickness layer-stacks of plurality of multi-layer cavities with the same structure. But in the 1260-1640 nm wavelength range, phenomena of light leakage or noises exist in wavelength ranges other than that of the signals of the filter.

However, the CWDM filter in accordance with the present invention further has a plurality of $\lambda/4$ multi-layer stacks with different structures on the basis of a few λ/4 Fabry-Perot cavities with the same structure thereof. Thus, the afore-mentioned light leakage or noises phenomena can be avoided thereby achieving wider optical application within the required wavelength ranges of optical communication field.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A coarse wavelength division multiplex (CWDM) optical filter for eliminating noise, comprising:
   a substrate;
   a first portion formed on the substrate and having at least two first stacking structures, each of the first stacking structures of the first portion having a Fabry-Perot cavity and a first coupling layer which are stacked over each other in turn from the substrate;
   a second portion superposed on the first portion, comprising at least two second stacking structures, each second stacking structure having an (HnLH) structure and a second coupling layer, wherein n is a positive integer greater than 1, L represents a low index layer with a thickness of $\lambda_o/4$, H represents a high index layer with a thickness of $\lambda_o/4$, and $\lambda_o$ is the center wavelength of said noise; and
   a first matching layer sandwiched between the first and second portions.

2. The CWDM optical filter as claimed in claim 1, wherein the second coupling layer is expressed as L, L is a low index layer with a thickness of $\lambda_o/4$, and $\lambda_o$ is the center wavelength of said noise.

3. The CWDM optical filter as claimed in claim 1, wherein n=2q, and q is a positive integer.

4. The CWDM optical filter as claimed in claim 1, wherein the first matching layer is expressed as mH, m is a positive integer, H is a high index layer with a thickness of $\lambda_o/4$, and $\lambda_o$ is the center wavelength of said noise.

5. The CWDM optical filter as claimed in claim 4, wherein m is chosen to be a positive even number.

6. The CWDM optical filter as claimed in claim 1, further comprising a second matching layer which is stacked on the second portion.

7. The CWDM optical filter as claimed in claim 6, wherein from the side of the substrate, the second matching layer sequentially includes a 1.7239 H sub-layer and a 0.582 L sub-layer, among which 0.582 L is a low index layer with a thickness of 0.582 multiple of $\lambda_o/4$, 1.7239 H is a high index layer with a thickness of 1.7239 multiples of $\lambda_o/4$, and $\lambda_o$ is the center wavelength of said noise.

8. The CWDM optical filter as claimed in claim 1, wherein from the side of the substrate, each Fabry-Perot cavity consists of $H'(L'H')^a kL'(H'L')^a H'$, wherein a positive integer, k is a positive integer greater than 1, H' is a high index layer with a thickness of $\lambda'_o/4$, L' is a low index layer with a thickness of $\lambda'_o/4$, and $\lambda'_o$ is the center wavelength of the transmitted light through the CWDM optical filter.

9. The CWDM optical filter as claimed in claim 8, wherein the first coupling layer is expressed as L'.

10. The CWDM optical filter as claimed in claim 9, wherein from the side of the substrate, the configuration of the first portion thereof is $H'(L'H')^2 6L'(H'L')^2 H'L'H'(L'H')^3 2L'(H'L')^3 H'L'H'(L'H')^3 6L'(H'L')^3 H'L'H'(L'H')^3 4L'(H'L')^3 H'L'H'(L'H')^3 6L'(H'L')^3 H'L'H'(L'H')^3 4L'(H'L')^3 H'L'H' (L'H')^3 6L'(H'L') ^3 H'L'H'(L'H')^3 2L'(H'L')^3 H'L'H'(L'H')^2 6L'(H'L') ^2 H'L'$.

11. The CWDM optical filter as claimed in claim 10, wherein $\lambda'_o$ is 1470 nm.

12. The CWDM optical filter as claimed in claim 1, wherein the front cut-off wavelength of the CWDM optical filter is 1230-1457 nm, and the behind cut-off wavelength of the CWDM optical filter is 1483-1640 nm.

13. The CWDM optical filter as claimed in claim 12, wherein the configuration of the second portion thereof is L(H2LH)L(H2LH)L(H4LH)L(H4LH)L(H4LH)L(H4LH)L (H4LH)L(H2LH)L.

14. A coarse wavelength division multiplex (CWDM) optical filter for eliminating noise thereof, comprising:
   a substrate;
   a first portion having at least two first stack structures, each of the first stack structures, from the side of the substrate, including a first multi-layer, a spacer layer, a second multi-layer and a first coupling layer;
   a second portion including at least two second stack structures, each of the second stack structures comprising a (HnLH) structure and a second coupling layer, and wherein n is a positive integer greater than 1, L represents a low index layer with a thickness of $\lambda_o/4$, H represents a high index layer with a thickness of $\lambda_o/4$, and $\lambda_o$ is the center wavelength of said noise; and
   a first matching layer sandwiched between the first and second portions.

15. The CWDM optical filter as claimed in claim 14, wherein the second coupling layer is expressed as L, L represents a low index layer with a thickness of $\lambda_o/4$, and $\lambda_o$ is the center wavelength of said noise.

16. The CWDM optical filter as claimed in claim 14, wherein n=2q, and q is a positive integer.

17. The CWDM filter as claimed in claim 14, wherein the first matching layer is expressed as mH, m is a positive integer, H represents a high index layer with a thickness of $\lambda_o/4$, and $\lambda_o$ is the center wavelength of the noise.

18. The CWDM optical filter as claimed in claim 17, wherein m is chosen to be a positive even number.

19. The CWDM optical filter as claimed in claim 14, further comprising a second matching layer formed on the second portion thereof.

20. The CWDM optical filter as claimed in claim 19, wherein from the side of the substrate, the second matching layer in turn includes 1.7239 H and 0.582 L, L represents a low index layer with a thickness of $\lambda_o/4$, H represents a high index layer with a thickness of $\lambda_o/4$, and $\lambda_o$ is the center wavelength of said noise.

21. The CWDM optical filter as claimed in claim 14, wherein the first and second multi-layers of each first stack structure of the first portion are symmetrically arranged with respect to the spacer layer.

22. The CWDM optical filter as claimed in claim 14, wherein the first multi-layer is expressed as $H'(L'H')a$, and the second multi-layer is expressed as $(H'L')^a H'$, among which a is a positive integer, L' represents a low index layer with a thickness of $\lambda'_o/4$, H' represents a high index layer with a thickness of $\lambda'_o/4$, and $\lambda'_o$ is the center wavelength of the transmitted light through the CWDM optical filter.

23. The CWDM optical filter as claimed in claim 22, wherein the spacer layer is expressed as kL', and k is a positive integer greater than 1.

24. The CWDM optical filter as claimed in claim 23, wherein the first coupling layer is L'.

25. The CWDM optical filter as claimed in claim 22, wherein from the side of the substrate, the first portion is: H'(L'H')$^2$ 6L(H'L')$^2$ H'L'H'(L'H')$^3$ 2L'(H'L')$^3$ H'L'H' (L'H')$^3$6L(H'L')$^3$H'L'H'(L'H')$^3$4L'(H'L')$^3$H'L'H'(L'H')$^3$ 6L'(H'L')$^3$ H'L'H'(L'H')$^3$4L'(H'L')$^3$H'L'H'(L'H')$^3$6L'(H'L')$^3$ H'L'H'(L'H')$^3$ 2L'(H'L')$^3$H'L'H'(L'H')$^2$6L'(H'L')$^2$ H'L'.

26. The CWDM optical filter as claimed in claim 25, wherein $\lambda'_0$ is 1470 nm.

27. The CWDM optical filter as claimed in claim 14, wherein the front cut-off wavelength of the CWDM optical filter is 1230-1457 nm, and the behind cut-off wavelength of the CWDM filter is 1483-1640 nm.

28. The CWDM optical filter as claimed in claim 27, wherein the second portion is: L(H2LH)L(H2LH)L(H4LH) L(H4LH)L(H4LH)L(H4LH)L(H4LH)L(H2LH)L(H2LH)L.

* * * * *